(12) United States Patent
Detwiler

(10) Patent No.: US 7,950,582 B2
(45) Date of Patent: May 31, 2011

(54) METHOD OF PRODUCING A COATED OPTICAL ELEMENT

(75) Inventor: Paul O. Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 366 days.

(21) Appl. No.: 12/198,177

(22) Filed: Aug. 26, 2008

(65) Prior Publication Data

US 2010/0051694 A1    Mar. 4, 2010

(51) Int. Cl.
  *G06K 7/10* (2006.01)
  *H02P 1/00* (2006.01)

(52) U.S. Cl. .................................................. 235/462.3

(58) Field of Classification Search ............. 235/462.43, 235/462.37, 462.4
See application file for complete search history.

(56) References Cited

U.S. PATENT DOCUMENTS

2002/0050523 A1* 5/2002 Veligdan .................. 235/462.07
2004/0022677 A1* 2/2004 Wohlstadter et al. ........... 422/52

* cited by examiner

*Primary Examiner* — Edwyn Labaze
(74) *Attorney, Agent, or Firm* — Paul W. Martin; Peter Priest

(57) ABSTRACT

A method of producing a coated optical element which uses in-mold decoration (IMG) techniques. The method includes injection molding an element adjacent a coating of a preform sheet, whereby the coating transfers to the element to create the optical element.

18 Claims, 4 Drawing Sheets

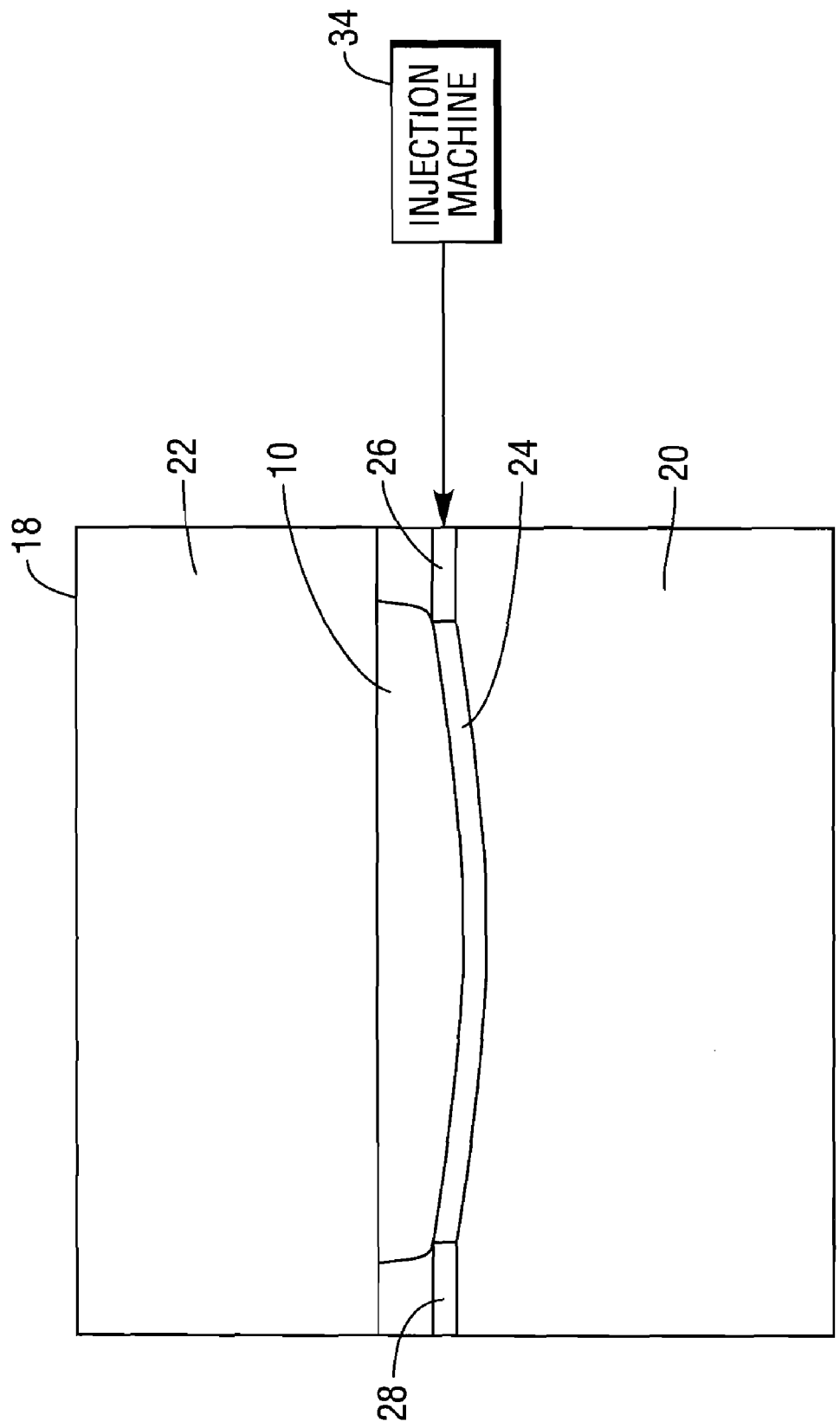

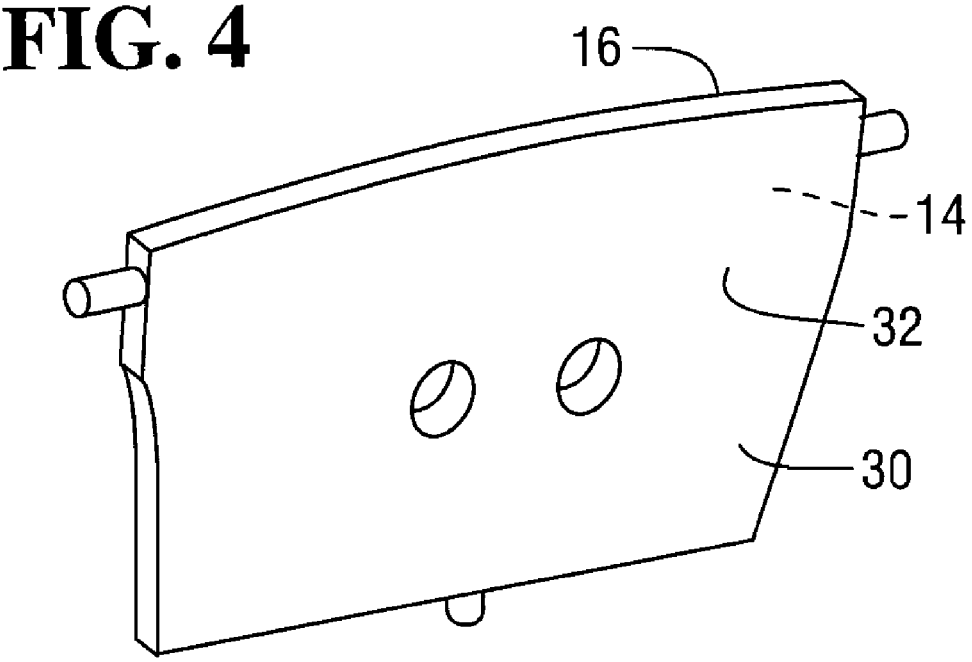

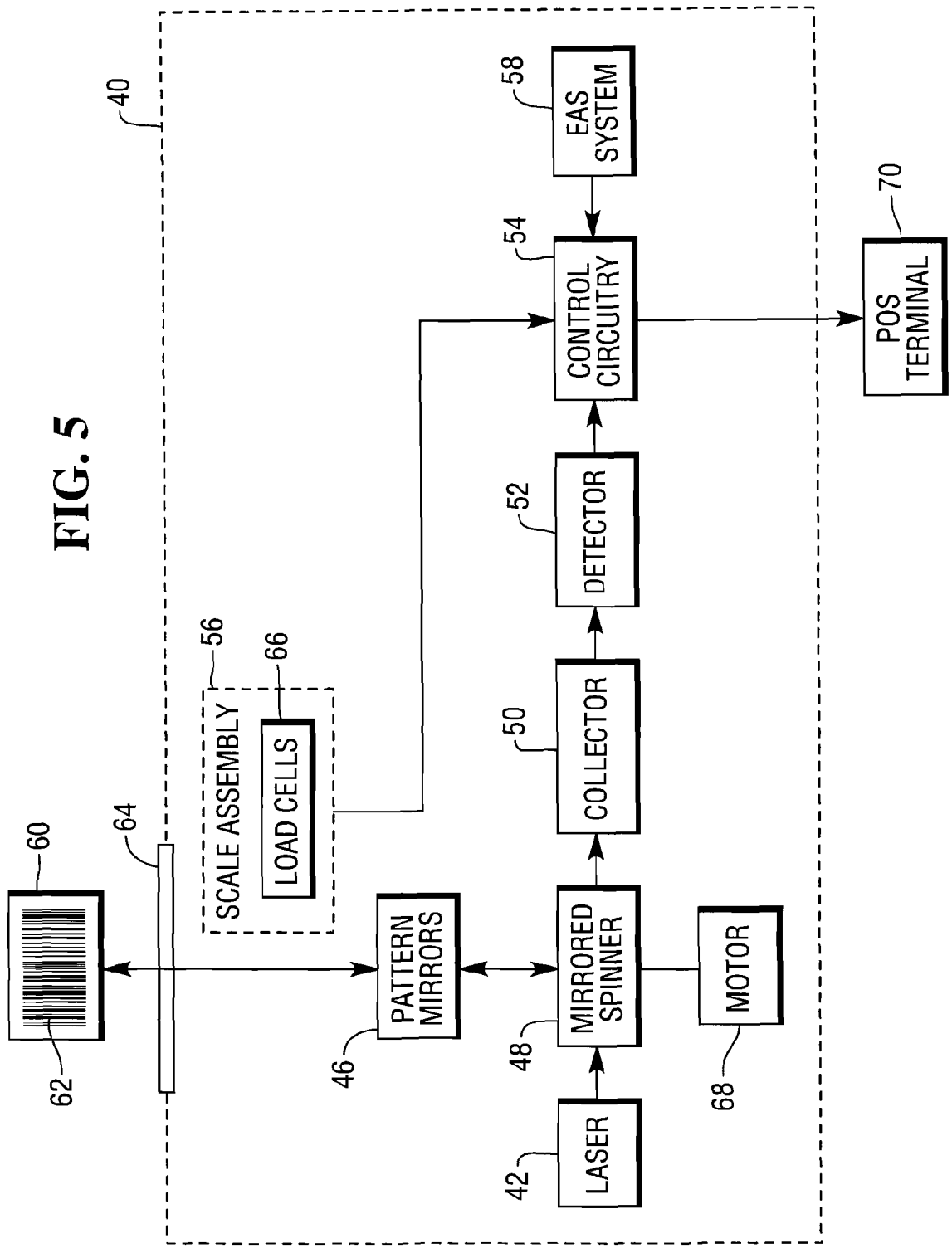

METHOD OF PRODUCING A COATED OPTICAL ELEMENT

BACKGROUND

There are a number of optical applications, including bar code scanning, in which reflective optical elements of moderate quality are acceptable. In many cases, injection molded polymer optics may be used as a lower cost alternative to glass optics. However, injection molded polymer optics must be made reflective or have coatings applied. This is a very expensive process and can easily double the cost of a molded optic.

It would be desirable to provide a method of producing a coated optical element which addresses these problems.

SUMMARY

A method of producing a coated optical element is provided.

The method includes injection molding an element adjacent a coating of a preform sheet, whereby the coating transfers to the element to create the optical element.

BRIEF DESCRIPTION OF THE DRAWINGS

FIG. 3 is a diagrammatic view of an injection molding system.
FIG. 4 is a perspective view of a molded optical element.
FIG. 5 is a block diagram of an optical scanner.

DETAILED DESCRIPTION

Figure 1:
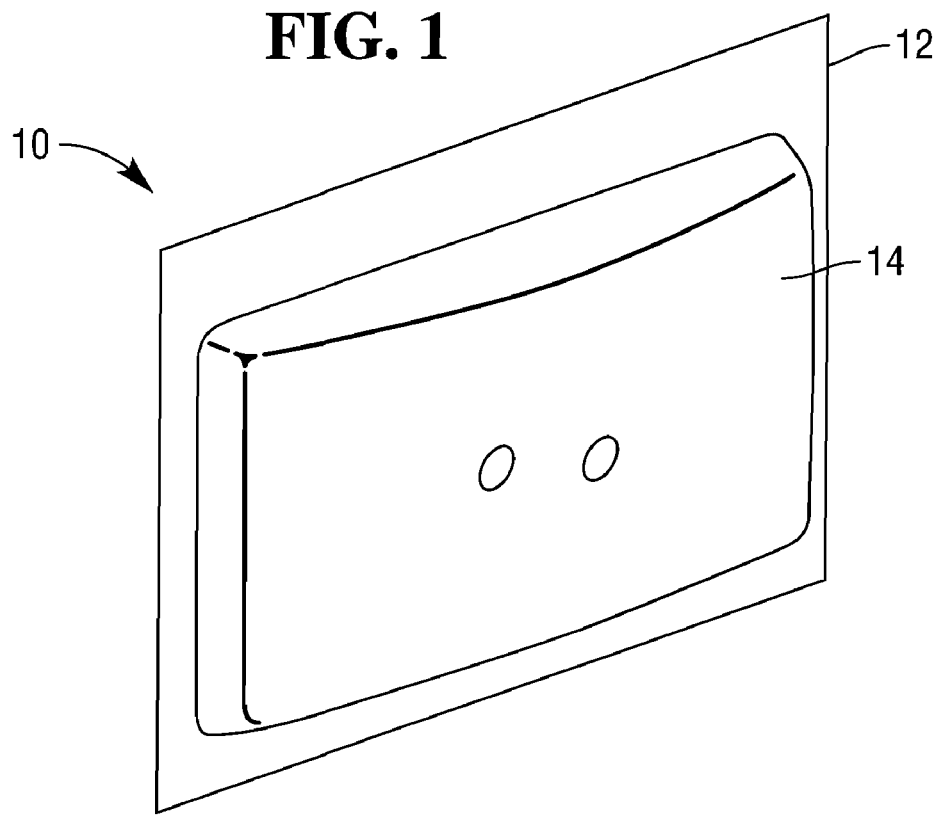
FIG. 1 is a perspective view of a preform.
Figure 2:
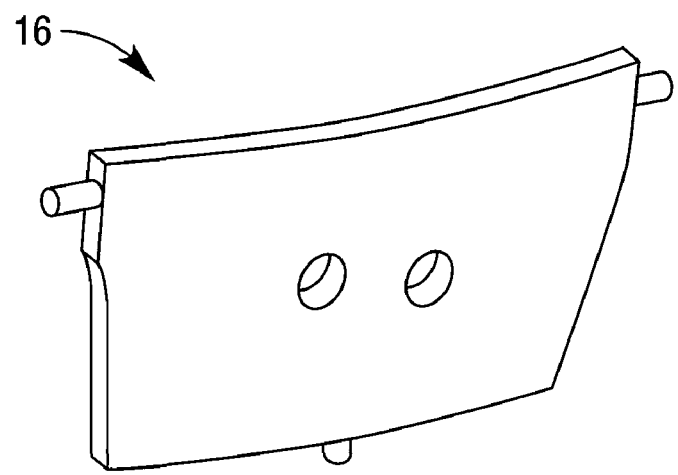
FIG. 2 is a perspective view of a molded element.

With reference to FIGS. 1-4, the method of the present invention uses in-mold decoration (IMG) techniques to create an optical element 36 with a reflective layer 30 (FIG. 4).

A preform sheet 10 (FIG. 1) includes a carrier 12 and a coating material 14 be transferred to a molded element 16 (FIG. 2) as it is being formed. Carrier 12 is made with a surface smooth enough to meet optical quality standards for optical elements formed by molding. An example carrier 12 may be made of a plastic, such as a polycarbonate resin.

An example material 14 for creating optical element 36 may include silver or other reflective material. An example preform sheet may include a silver metalized polycarbonate sheet.

Molded element 16 may be made of a plastic, such as a polycarbonate resin.

In accordance with an example process, preform sheet 10 is positioned between first and second sections 20 and 22 of mold 18, with material 14 facing void 24 (FIG. 3). Void 24 has the shape of molded element 16. Injection machine 34 injects injection material, such as plastic, through aperture 26 into void 24 until void 24 is completely filled. Injection machine 34 may force excess injection material through aperture 28. During the molding process, coating material 14 adheres to the injection material. After the injection material solidifies, mold 18 is opened and optical element 36 is removed.

Preform sheet 10 may additionally include a thin protective film 32 between carrier 12 and coating material 14. During molding, protective film 32 transfers to molded element 16 along with coating 14. Protective film 32 protects the coated surface of resulting optical element 36 until at some point during assembly of an optical device it is removed to expose coating material 14.

An illustrated example optical element 36 includes a collector for an optical bar code scanner, such as the one found in a dual-aperture bar code scanner as disclosed in copending U.S. application Ser. No. 12/116,740, which is hereby incorporated by reference.

However, the present invention envisions using IMG techniques to create optical elements for other types of devices besides bar code scanners. Further, the present invention envisions using IMG techniques to produce various amounts of reflectivity.

With reference to FIG. 5, an example embodiment of optical barcode scanner 40 includes laser 42, mirrored spinner 48, pattern mirrors 46, collector 50, detector 52, and control circuitry 54. Scanner 40 may also include scale assembly 46 and electronic article surveillance (EAS) system 48.

Laser 42 produces a laser beam.

Mirrored spinner 48 directs the laser beam to pattern mirrors 46 to produce a scan pattern, and receives reflected light from item 60 from pattern mirrors 46. Mirrored spinner 48 is rotated by motor 68

Pattern mirrors 16 direct the laser beam through window 64 towards bar code label 62 and direct the reflected light to mirrored spinner 48.

Collector 50 collects the reflected light from mirrored spinner 48 and directs it towards detector 52.

Detector 52 converts the reflected light into electrical signals.

Control circuitry 54 controls operation of scanner 40 and additionally processes the electrical signals to obtain information encoded in bar code label 52. Control circuitry 54 sends the information to point-of-sale (POS) terminal 70.

In an alternate embodiment, scanner 40 may include two or more windows 64, and correspondingly may include additional lasers 42, mirrored spinners 48, sets of pattern mirrors 46, collectors 50, detectors 52, and control circuitries 52 for scanning item 60 from additional directions.

In addition to collector 50, mirrored spinner 48 and pattern mirrors 46 may all be formed using the IMG techniques disclosed herein. Additional types of optical elements found in other bar code scanners, such as folding or bending mirrors, may also be formed using the IMG techniques.

Although particular reference has been made to certain embodiments, variations and modifications are also envisioned within the spirit and scope of the following claims.

What is claimed is:

1. A method of producing a focusing optical element comprising:
    positioning a preform sheet comprising a carrier and a coating material in a mold having a void having a shape corresponding to that of an element for focusing light, with the coating material facing the void;
    injecting injection material into the void to mold the element having the shape for focusing light adjacent the coating of the preform sheet, whereby the coating transfers to the element to create the focusing optical element.

2. The method of claim 1, wherein the coating comprises silver.

3. The method of claim 1, wherein the optical element is a reflective optical element.

4. The method of claim 1, wherein the optical element is a component of a bar code scanner.

5. The method of claim 1 wherein the carrier has a surface smooth enough to meet optical quality standards for optical elements formed by molding.

6. The method of claim 5 wherein the carrier is made of a polycarbonate resin.

7. The method of claim 1 wherein the carrier comprises a polycarbonate sheet and the coating material comprises silver metallization on the polycarbonate sheet.

8. The method of claim 1 wherein the preform sheet additionally comprises a thin protective film between the carrier and the coating material which is removed during assembly of the optical device to expose the coating material.

9. A bar code scanner comprising:
    a laser;
    an optical element produced by positioning a preform sheet comprising a carrier and a coating material in a mold having a void having a shape corresponding to that of an element for focusing light, with the coating material facing the void; injecting injection material into the void to mold the element having the shape for focusing light adjacent the coating of the preform sheet, whereby the coating transfers to the element to create the optical element;
    a detector; and
    control circuitry.

10. The bar code scanner of claim 9, wherein the optical element comprises a focusing mirror.

11. The bar code scanner of claim 10, wherein the focusing mirror comprises a collector for focusing light reflected from an item towards the detector.

12. The bar code scanner of claim 9, wherein the optical element comprises a mirrored spinner.

13. The bar code scanner of claim 9, wherein the optical element comprises a pattern mirror.

14. The bar code scanner of claim 9, wherein the optical element reflects a laser beam for scanning an item.

15. The barcode scanner of claim 9 wherein the carrier has a surface smooth enough to meet optical quality standards for optical elements formed by molding.

16. The barcode scanner of claim 15 wherein the carrier is made of a polycarbonate resin.

17. The barcode scanner of claim 9 wherein the carrier comprises a polycarbonate sheet and the coating material comprises silver metallization on the polycarbonate sheet.

18. The barcode scanner of claim 9 wherein the preform sheet additionally comprises a thin protective film between the carrier and the coating material which is removed during assembly of the optical device to expose the coating material.

* * * * *